A. R. GIBSON.
LIVE BAIT HOLDER.
APPLICATION FILED AUG. 25, 1911.

1,025,695.

Patented May 7, 1912.

Adelbert R. Gibson, Inventor

Witnesses
Jas. K. McCathran
F. T. Chapman

By
C. G. Siggers
Attorney

UNITED STATES PATENT OFFICE.

ADELBERT R. GIBSON, OF LOS ANGELES, CALIFORNIA.

LIVE-BAIT HOLDER.

1,025,695.

Specification of Letters Patent.

Patented May 7, 1912.

Application filed August 25, 1911. Serial No. 646,060.

*To all whom it may concern:*

Be it known that I, ADELBERT R. GIBSON, a citizen of the United States, residing at Los Angeles, in the county of Los Angeles and State of California, have invented a new and useful Live-Bait Holder, of which the following is a specification.

This invention has reference to improvements in live-bait holders, and is designed to provide a means whereby live bait may be confined in a device carrying fish hooks, whereby the bait is given entire freedom of movement for swimming and is enabled to swim away from the fisherman, the device being intended for fishing purposes. While the device is not confined to any particular kind of live bait, it is especially adapted for use in connection with minnows or other like small fish, which are used as bait in fishing for larger fish.

In accordance with the present invention there is provided a metallic harness which is readily adapted to small fish of different sizes, while there is no interference with the fins, gills, or tail of the fish, wherefore the latter is free to swim naturally without restriction other than caused by the harness and line, and, moreover, the fish is so held by the harness or frame that its head is directed away from the line and consequently the natural swimming movements of the fish will cause it to travel in a direction away from the line. The harness is provided with oppositely directed hooks so arranged that a larger fish attempting to swallow the bait from either the head or the tail end will be engaged by the hooks carried by the harness, and so caught.

The invention will be best understood from a consideration of the following detailed description, taken in connection with the accompanying drawings forming a part of this specification, with the understanding, however, that while the drawings show a practical embodiment of the invention the latter may be variously modified so long as the salient features of the invention are retained.

Figure 1:
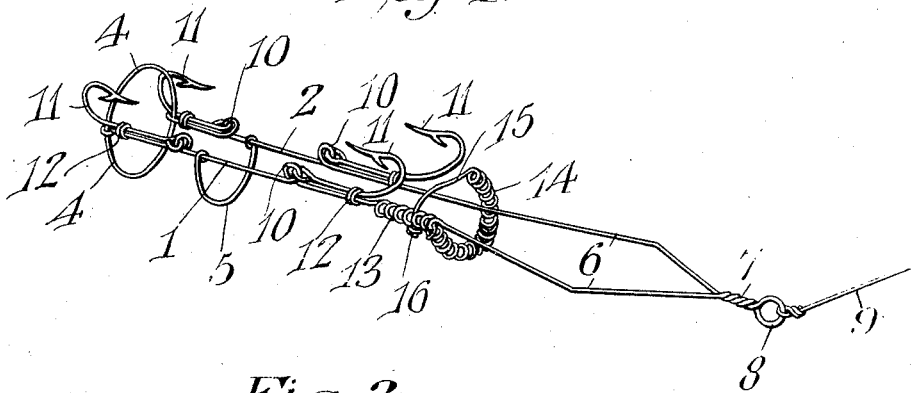
Figure 2:
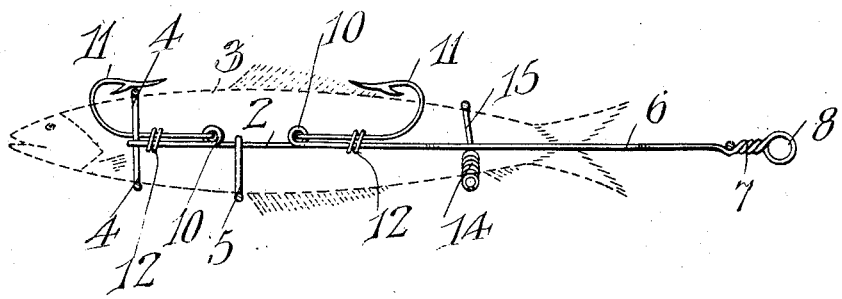
Figure 3:
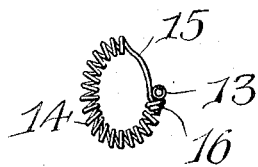

In the drawings:—Figure 1 is a perspective view of the bait holder in the position assumed when a fish is lodged therein. Fig. 2 is a central longitudinal section through the bait holder showing a dotted outline of a fish to illustrate the relative positions of the parts with relation to a fish. Fig. 3 is a cross section of the holder at the rear clamping device.

Referring to the drawings, there is shown a holder comprising two side members 1, 2, designed to lie along the two sides of the body of a fish, such as indicated in dotted lines at 3, Fig. 2. At one end of the frame or harness the two side members are secured to opposite sides of a ring 4 which may be elliptical in shape in conformity with the shape of the head end of the small fish, so that the head of the fish may be introduced through the ring 4 until the gills and pectoral fins have been passed. At an intermediate point the two side members 1 and 2 are joined by a yoke 5 designed to underride the body of the fish at an appropriate point. The side numerals have each a continuation 6 at the end remote from the ring 4, and this continuation is first bent outwardly from the longitudinal center line of the holder or harness and then inwardly toward such center line. Those ends of the extensions 6, which approach each other are finally brought together and formed into a twist 7 terminating in an eye 8 designed to receive one end of a fish line 9. The two side members 1 and 2 with their extensions 6, twist 7 and eye 8 may be all made of one piece of wire if desired. On opposite sides of the yoke 5 the side members 1 and 2 are formed into eyes 10 in each of which there is engaged the eye end of a fish hook 11, and each fish hook is secured to the respective side members of a wrapping 12 of wire, or by any other means. By this construction the fish hooks are held to the side members by the eyes 10 and project in opposite directions from the yoke 5, the construction being such that the points of the fish hooks on the respective sides of the holder or harness are directed one toward the other, there being two fish hooks on opposite sides of the head end of the harness, that is the end designed to receive the head of the fish, with the points directed toward the tail of the fish, and there are two hooks near the tail end of the harness with the points of the hooks directed toward the head end of the fish, wherefore a larger fish attempting to swallow the small fish at either the head or the tail end thereof will be caught by the hooks there located.

Fast to one of the side members, say the side member 1, adjacent the extension 6 is a coil 13 which may be made of wire and is wound about the side member after the manner of an open spring. There is also provided another open coil 14 having one end formed into a loop engaging the loops of the coil 13, so that the coil 14 may be adjusted along the coil 13 by being carried around the same after the manner of a screw. The other end of the loop 14 may be in the form of an approximately straight strand 15 terminating in an enlargement 16 which may be formed by one or more tight coils of the member 15. The coil 14 with its extension 15 is of a length to encircle the body of the fish near the tail, but in position to offer no interference to the fins of the fish, and in order to accommodate fishes of different sizes, the coil 14 is adjustable along the coil 13, and the portion 15 may be passed between any adjacent turns of the coil 13, so that the enlargement 16 will lock therein to prevent the coil 14 from becoming loosened.

A small fish, such as a minnow of appropriate size, is introduced into the holder or harness by passing the head of the fish through the loop 14 from the side thereof to which the side members 1 and 2 are attached. The ring 4 may engage around the body of the fish quite closely thereto without binding, while the tail of the fish will be lodged between the extended and then narrowed portions of the frame defined by the bent extensions 6. The coil 14 is then passed about the body of the fish between the dorsal and ventral fins and the tail and the coil 14 is locked in position by engagement of the portion 15 with its head 16 in an appropriate portion of the coil 13, the coil 14 having been adjusted along the coil 13 in accordance with the size of the fish to be lodged in the harness or holder. The yoke 5 engages under the body of the fish between the pectoral fins and the ventral fin, thus preventing the body of the fish from sagging with relation to the harness. The fish is so disposed with relation to the harness that none of the fins is confined at all, but is free for natural use, and the gills are also not confined in any manner and the natural breathing of the fish may proceed. Moreover, the tail has free room for side movement, while at the same time the fish line will trail after the fish as the latter swims away from the fisherman.

The free movements of the fish are the same as a free fish swimming through the water and consequently the larger fish are more easily enticed to attempt to swallow the bait than would be the case were the bait simply pulled along by the fishing line without the natural freedom of movement. The harness by not interfering in any manner with the natural swimming movements of the fish does not prevent the attempt of the fish to escape, which it will do as soon as placed in the water.

The whole device may be very cheaply made of wire or other like form of metal, some of the parts being joined to others simply by being coiled therearound, and some parts may be soldered to others, and the whole structure may be plated with any suitable metal resistant to the action of water, whether fresh water or salt water.

When the bait has been swallowed by a larger fish, or for any reason it is desirable to put a new live fish in the harness, this is easily accomplished by loosening the end 15 of the coil 14 and introducing the new fish head foremost, through the ring 4 and then again fastening the coil 14 in place in such adjustment of this coil as may be found necessary to accommodate the new fish which may be of a different size from the first fish.

What is claimed is:—

1. A bait holding device or harness comprising side members adapted to lie along the opposite sides of the body of a fish, a closed ring adapted for the passage of the head of a fish therethrough and having the side members secured thereto, a yoke connecting the side members and adapted to underride the body of the fish at an intermediate point, and a separable loop adapted to encircle the body of a fish near the tail thereof when in the harness and also to inclose the side members, the latter being provided with elongations first diverging and then converging, and finally united and formed into a loop for the attachment of a fishing line, the side members carrying fish hooks.

2. A bait holding device or harness comprising side members adapted to lie along the opposite sides of the body of a fish, a closed ring adapted for the passage of the head of a fish therethrough and having the side members secured thereto, a yoke connecting the side members and adapted to underride the body of the fish at an intermediate point, a separable loop adapted to encircle the body of a fish near the tail thereof when in the harness and also to inclose the side members, the latter being provided with elongations first diverging and then converging and finally united and formed into a loop for the attachment of a fishing line, the side members being formed at spaced points with loops, and fish hooks having their pointed ends free and their other ends engaged in the respective loops on the side members and also secured to said side members adjacent the pointed ends.

3. A bait holder or harness having a loop member and a supporting and locking member therein in the form of a coil to which one end of the loop member is secured and along which it may be adjusted lengthwise of the harness, said loop member having a free end adapted to lock in the coil in any position of adjustment therealong.

4. A bait holding device or harness comprising side members adapted to lie along opposite sides of the body of a fish, fish embracing members through respective ones of which the head and tail portions of the fish may project, the side and embracing members being related to leave the head of the fish entirely free and the tail and other swimming members also entirely free, the side members being continued in spaced relation one to the other for the accommodation of the tail and beyond the tail arranged for the attachment of a fish line thereto, the bait holder carrying fish hooks.

5. A bait holding device or harness comprising side members adapted to lie along opposite sides of the body of a fish, fish embracing members through respective ones of which the head and tail portions of the fish may project, the side and embracing members being related to leave the head of the fish entirely free and the tail and other swimming members also entirely free, the side members being continued in spaced relation one to the other for the accommodation of the tail and beyond the tail arranged for the attachment of a fish line thereto, and the bait holder being provided with oppositely directed fish hooks back of the head portion of a fish when in the bait holder and in front of the tail portion of a fish when in the bait holder, said fish hooks being out of piercing relation to the body of the fish.

6. A bait holder or harness provided with fish supporting and embracing means spaced apart a distance less than the length of the fish to be held, said bait holder being provided with a tail receiving portion having members spaced apart a distance to permit swimming movements of the tail without interference therewith and provided to the rear of the tail space with means for the attachment of a fish line.

7. A bait holder or harness for live bait provided with means for embracing and supporting the body of a fish, said holder having continuations spread apart for the accommodation of the tail of a fish without interference with its swimming movements and then united for the attachment of a fish line at a point to the rear of the tail end of the bait holder.

In testimony, that I claim the foregoing as my own, I have hereto affixed my signature in the presence of two witnesses.

ADELBERT R. GIBSON.

Witnesses:
CLARA B. NELSON,
WILMA L. STEIN.